US011922200B2

(12) United States Patent
Bansal et al.

(10) Patent No.: US 11,922,200 B2
(45) Date of Patent: Mar. 5, 2024

(54) REMOTE NETWORK CONTROL FOR NETWORK VIRTUALIZATION

(71) Applicant: MICROSOFT TECHNOLOGY LICENSING, LLC, Redmond, WA (US)

(72) Inventors: Deepak Bansal, Bellevue, WA (US); Qi Zhang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 636 days.

(21) Appl. No.: 16/853,655

(22) Filed: Apr. 20, 2020

(65) Prior Publication Data
US 2021/0326160 A1      Oct. 21, 2021

(51) Int. Cl.
*G06F 9/455*          (2018.01)
*G06F 9/50*           (2006.01)
*H04L 45/586*         (2022.01)

(52) U.S. Cl.
CPC ........ *G06F 9/45558* (2013.01); *G06F 9/5072* (2013.01); *H04L 45/586* (2013.01);
(Continued)

(58) Field of Classification Search
CPC ............... G06F 9/45558; G06F 9/5083; G06F 2009/45587; G06F 2009/45595; G06F 9/5072; H04L 45/586
See application file for complete search history.

(56) References Cited

U.S. PATENT DOCUMENTS 9,491,111 B1 *  11/2016  Roth .................. H04L 47/70
10,079,681 B1 *   9/2018  Roth .................. H04L 67/10
(Continued)

FOREIGN PATENT DOCUMENTS

WO     2017035536 A1     3/2017

OTHER PUBLICATIONS

"International Search Report and Written Opinion Issued in PCT Application No. PCT/US21/022267", dated Jun. 4, 2021, 11 Pages.
(Continued)

*Primary Examiner* — Benjamin C Wu
(74) *Attorney, Agent, or Firm* — Han Gim; Newport IP, LLC (57) ABSTRACT

A virtual network comprising virtual machines executing at a computing environment remote from the virtualized computing service provider is implemented. A control plane management functions is configured to provide and implement the virtual machines of the virtual network and executed at the virtualized computing service provider. Data plane management functions are configured to manage data traffic to and from the virtual machines of the virtual network and executed at the remote computing environment. A secure network connection between the virtualized computing service provider and the remote computing environment is established. The control plane management functions cause instantiation of the virtual machines of the virtual network at the remote computing environment. Using the control plane management functions executing at the virtualized computing service provider, operation of the virtual machines of the virtual network is managed. Using the data plane management functions executing at the remote computing environment, operation of data plane operations at the virtual machines executing at the remote computing environment is allowed.

17 Claims, 8 Drawing Sheets

(52) U.S. Cl.
CPC .............. *G06F 2009/45587* (2013.01); *G06F 2009/45595* (2013.01)

(56) References Cited

U.S. PATENT DOCUMENTS

| | | | |
|---|---|---|---|
| 10,938,782 B1* | 3/2021 | Harland | .................. H04L 63/10 |
| 11,620,081 B1* | 4/2023 | Liguori | ................. G06F 3/0626 |
| | | | 711/154 |
| 2011/0314520 A1 | 12/2011 | Olszewski et al. | |
| 2012/0281708 A1 | 11/2012 | Chauhan et al. | |
| 2016/0105488 A1 | 4/2016 | Thakkar et al. | |
| 2016/0366233 A1 | 12/2016 | Le et al. | |
| 2017/0111274 A1 | 4/2017 | Bays et al. | |
| 2017/0293501 A1 | 10/2017 | Barapatre et al. | |
| 2019/0058714 A1* | 2/2019 | Joshi | ................... H04L 63/1441 |
| 2020/0007460 A1* | 1/2020 | Guim Bernat | ........ H04L 47/765 |
| 2020/0409611 A1* | 12/2020 | Olson | ................... G06F 3/0617 |
| 2021/0168203 A1* | 6/2021 | Parulkar | ................. H04L 67/60 |

OTHER PUBLICATIONS

"Making Private-Public Cloud Decisions on the Way to a Hybrid Cloud", In White Paper of Intel, Nov. 2014, 11 Pages.
"NSX Cloud Blog Series: Part 1", Retrieved from: https://blogs.vmware.com/networkvirtualization/2018/06/nsx-cloud-blog-series-part-1.html, Jun. 21, 2018, 8 Pages.
Yengar, Ashok, "Cloud at the Edge", Retrieved from: https://www.ibm.com/cloud/blog/cloud-at-the-edge, Feb. 26, 2019, 6 Pages.
Watts, Stephen, "Reverse Hybrid Cloud: How the Cloud is Moving on-Premises", Retrieved from: https://www.cio.com/article/3294227/reverse-hybrid-cloud-how-the-cloud-is-moving-on-premises.html, Aug. 3, 2018, 4 Pages.

* cited by examiner

REMOTE NETWORK CONTROL FOR NETWORK VIRTUALIZATION

BACKGROUND

A data center may house computer systems and various networking, storage, and other related components. Data centers may, for example, be used by service providers to provide computing services to businesses and individuals as a remote computing service or provide "software as a service" (e.g., cloud computing). In some cases, such users may wish to use of some of their computing or storage assets on their own premises, or install resources from the service provider on their premises, while taking advantage of the cloud computing capabilities of the data center. However, the incorporation of such assets into the data center's networks may raise a number of issues.

It is with respect to these considerations and others that the disclosure made herein is presented.

SUMMARY

In various embodiments, users of a remote computing service such as a cloud computing service may be provided the option of continuing to use such services while installing some of the computing and storage resources of the remote computing service at the users' location ("on-premises"). In some embodiments, the users may be provided the option of retaining their own computing and storage resources. The users may continue to benefit from the remote computing services, while incorporating aspects of the services into the users' premises. Systems and methods are disclosed herein for enabling such integration of services between the remote computing service and the user-located resources, while maintaining a seamless user experience as was provided entirely via the remote computing service. For example, users who have implemented virtual networks in the cloud may continue to use their virtual networks using both the cloud across remote resources and on-premises resources. Rather than running a completely private network, users may avoid incompatibilities with the remote computing service, as well as the overhead and cost associated with running all of the resources locally.

When incorporating user on-premise resources, it is desirable to apply existing policies to the on-premise resources without impacting the performance of the user's virtual machines in their virtual network. In various embodiments, the details of the infrastructure for providing management and data connectivity across the cloud across remote resources and on-premises resources may be abstracted from the user. The described techniques enable users of a remote computing service to deploy their user footprints closer to their premises, thereby extending the reach of the remote computing service to the user premises. For example, a user may want to deploy some remote computing service capabilities to their on-site production environment or execute virtual machines and run workloads on hardware located on-premise. In some embodiments, user provided hardware may confirm to requirements established by the remote service provider and may be similar to hardware that is implemented at the remote service provider. In some embodiments, the hardware may be provided by the service provider. The service provider may establish compatibility requirements for all hardware that is integrated into service providers network. In some cases, if the user has sufficient on-premise resources, the user may be able to continue aspects of their operations even when their connection to the remote computing service is disconnected.

The disclosed embodiments enable extension of a private network in the cloud to the user's premises and enable remote network management of the extended resources that run at the user premises. The disclosed architecture may include identification of capabilities that may be allocated locally, and capabilities that may be executed by the remote cloud. The division of responsibilities can be based on latency, security, and other factors. In one example implementation, the data plane may be implemented locally (on premises), and the control plane may be implemented remotely (e.g., at the data center). Reduction of latency may consider the time for communicating data between the on-premise network and the data center. Data plane functions are typically high volume, and therefore data plane functions and their management may execute with reduced latency when their operations are contained at the on-premise network. Control plane functions may be lower volume than data plane functions, and therefore may execute at the data center without significant impact. Furthermore, it would be efficient for the data center to maintain control and visibility of the user's resources and services, to ensure seamless operation.

In one embodiment, the network controller, service controller, and the load balancer controller may be implemented remotely (at the data center), and the virtual network mapping service, load balancer data forwarder, service data plane, and the virtual machines may be implemented run locally (at the user premises). In some configurations, the virtual network mapping service, load balancer data forwarder, service data plane, and the virtual machines may be run locally at the user premises and one or more of these services may also be maintained at the data center. Additionally, a trust model may be implemented that allows the user's functionality to run partially on premises and at the remote computing service while maintaining a separation from other user's data at the remote computing service.

The described techniques can allow for incorporation of a user's resources on-premises while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

In some computing environments that provide virtualized computing and storage services, various computing and network services may be configured to enable users of a remote computing service to deploy their user footprints closer to their premises, thereby extending the reach of the remote computing service to the user premises. For example, an enterprise that provides network carrier services may want computing services located closer to their networks or their customers, or a manufacturer may want to deploy computing resources closer to their facilities. Users of virtualized computing resources may benefit in many ways by deploying resources such as virtual machines on resources that are located on their premises. Localization of aspects of virtualized computing services may enable users to more effectively meet data residency, compliance, latency, and other requirements, while continuing to benefit from many of the advantages of utilizing remote and/or virtualized computing services, such as scalability and flexibility.

Traditionally, many users who wanted to deploy localized virtual computing resources opted to implement a private cloud where all resources are implemented locally and under the user's control and responsibility. However, private networks may have compatibility issues when attempting to interface with the public cloud. Additionally, the overhead and cost to run all services locally for the user is typically much higher and may be difficult to scale or reconfigure.

The disclosed embodiments enable various scenarios for implementing extensions of the public cloud to local deployments using a hybrid architecture that enables federated options for local and remote data and control management. The disclosed embodiments further enable such extensions to be implemented in a manner that reduces the cost and complexity of such networks, allowing for more efficient use of computing, storage, and network resources.

The reach between remote and on-premise computing resources can be complex. For example, a remote computing service provider may implement multiple service regions and microregions. Some solutions may include dedicating a region and/or a microregion for a particular user. Other solutions may involve the remote service provider providing the remote service provider's hardware resources to the user for installation on their premises. The present disclosure enables the incorporation of computing resources located at the user premises with services provided at the remote service provider to implement a comprehensive solution to the user's needs. The computing resources may be provided by the user or provided by the remote service provider. Such capabilities may be implemented where the user is using their own computing resources locally, where the remote service provider has provided the computing resources for local installation, or a combination. Various embodiments disclosed herein include the integrated and federated management of the entire end-to-end capability, which may include remote management of the user's local resources.

Management of the end-to-end capability service by the remote service provider can enable an experience that is seamless and more consistent between local and public user footprints. The integration of local and remote resources with a comprehensive remote resource management approach can minimize the overhead for the user, who will not need to perform complex management tasks such as versioning and upgrades. The effective distribution of the management functions can be determined based on the implications for various performance and security implications such as latency and data security.

In one embodiment, the data plane functions can be implemented locally at the user premises, and the control plane can be implemented remotely at the remote service provider. Data plane functions can include the processing and management of user data, while the control plane functions can include deployment and management of virtual machines and virtual network resources. The remote management of the end-to-end services in the manner disclosed herein can be provided regardless of the specific hardware that is at the user's premises. Furthermore, remote management of the end-to-end services can be provided regardless of the ownership of the specific hardware at the user's premises. As used herein, "local" may refer to resources at the physical on-premises location of the user, and "remote" may refer to the resources provided by the remote service provider.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples.

Figure 1:
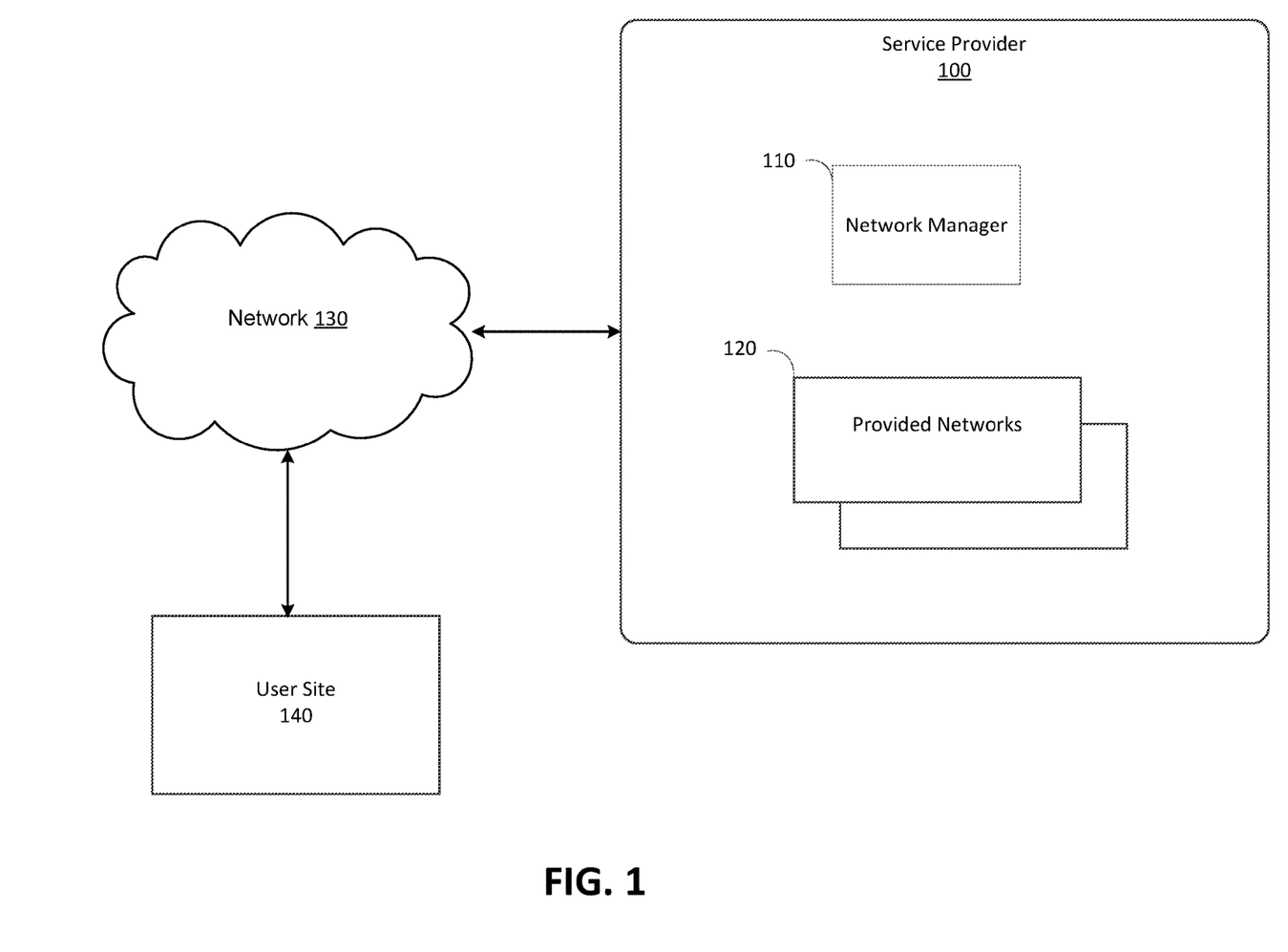
FIG. 1 is a diagram illustrating an example architecture in accordance with the present disclosure.

FIG. 1 illustrates an example computing environment in which the embodiments described herein may be implemented. FIG. 1 illustrates a service provider 100 that is configured to provide computing resources to users at user site 140. The user site 140 may have user computers that may access services provided by service provider 100 via a network 130. The computing resources provided by the service provider 100 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 100 may have various computing resources including servers, routers, and other devices that may provide remotely accessible computing and network resources using, for example, virtual machines. Other resources that may be provided include data storage resources. Service provider 100 may also execute functions that manage and control allocation of network resources, such as a network manager 110.

Network 130 may, for example, be a publicly accessible network of linked networks and may be operated by various entities, such as the Internet. In other embodiments, network 130 may be a private network, such as a dedicated network that is wholly or partially inaccessible to the public. Network 130 may provide access to computers and other devices at the user site 140.

Figure 2:
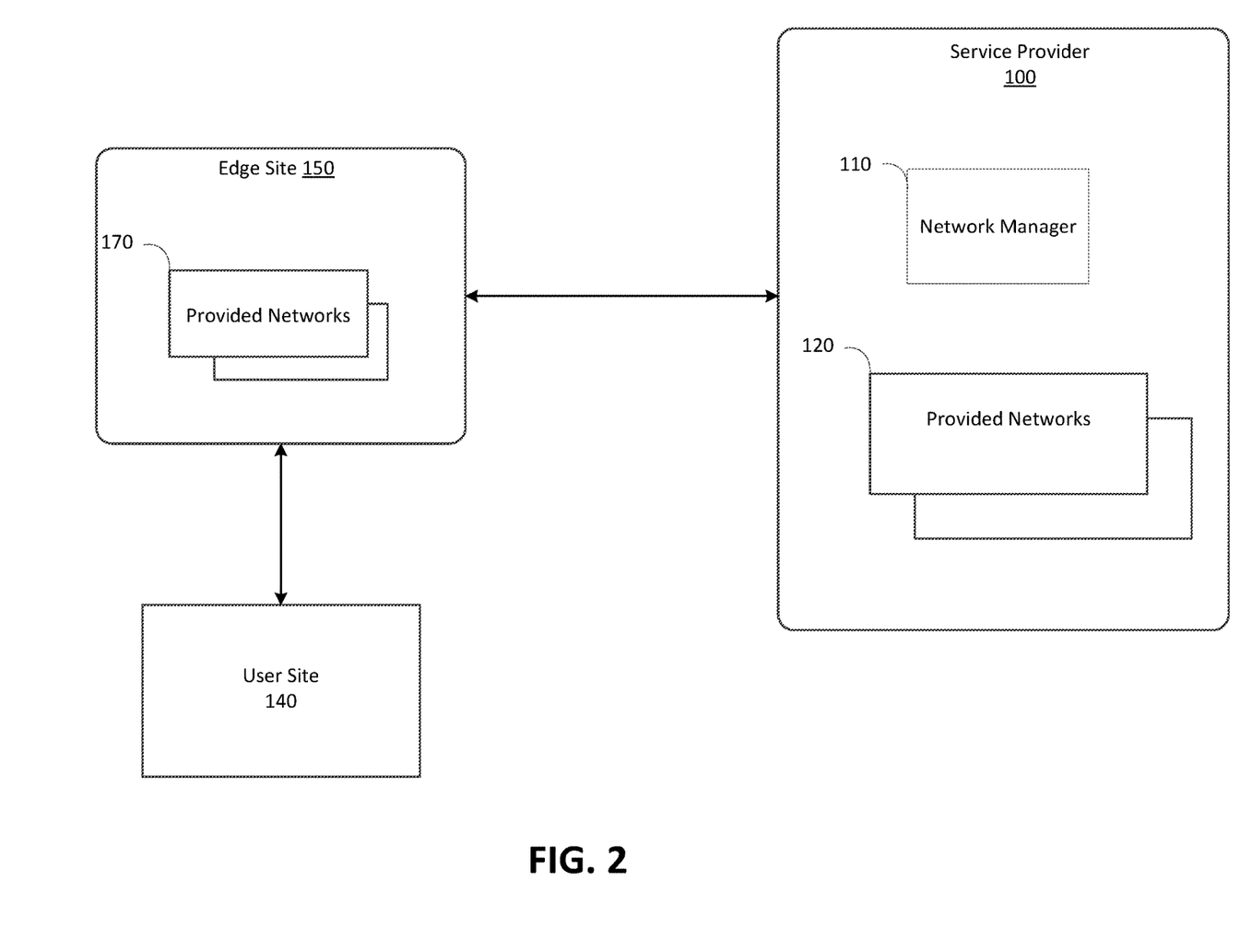
FIG. 2 is a diagram illustrating an example architecture in accordance with the present disclosure.

FIG. 2 illustrates an example computing environment in which the embodiments described herein may be implemented. FIG. 2 illustrates that an edge site 150 may be implemented to extend the physical reach of service provider 100 to provide localized computing resources to users at user site 140 using provided networks 170. The computing resources provided by the edge site 150 may include some or all of the various types of resources provided by service provider 100. The resources at edge site 150 may be under the control of service provider 100.

Figure 3:
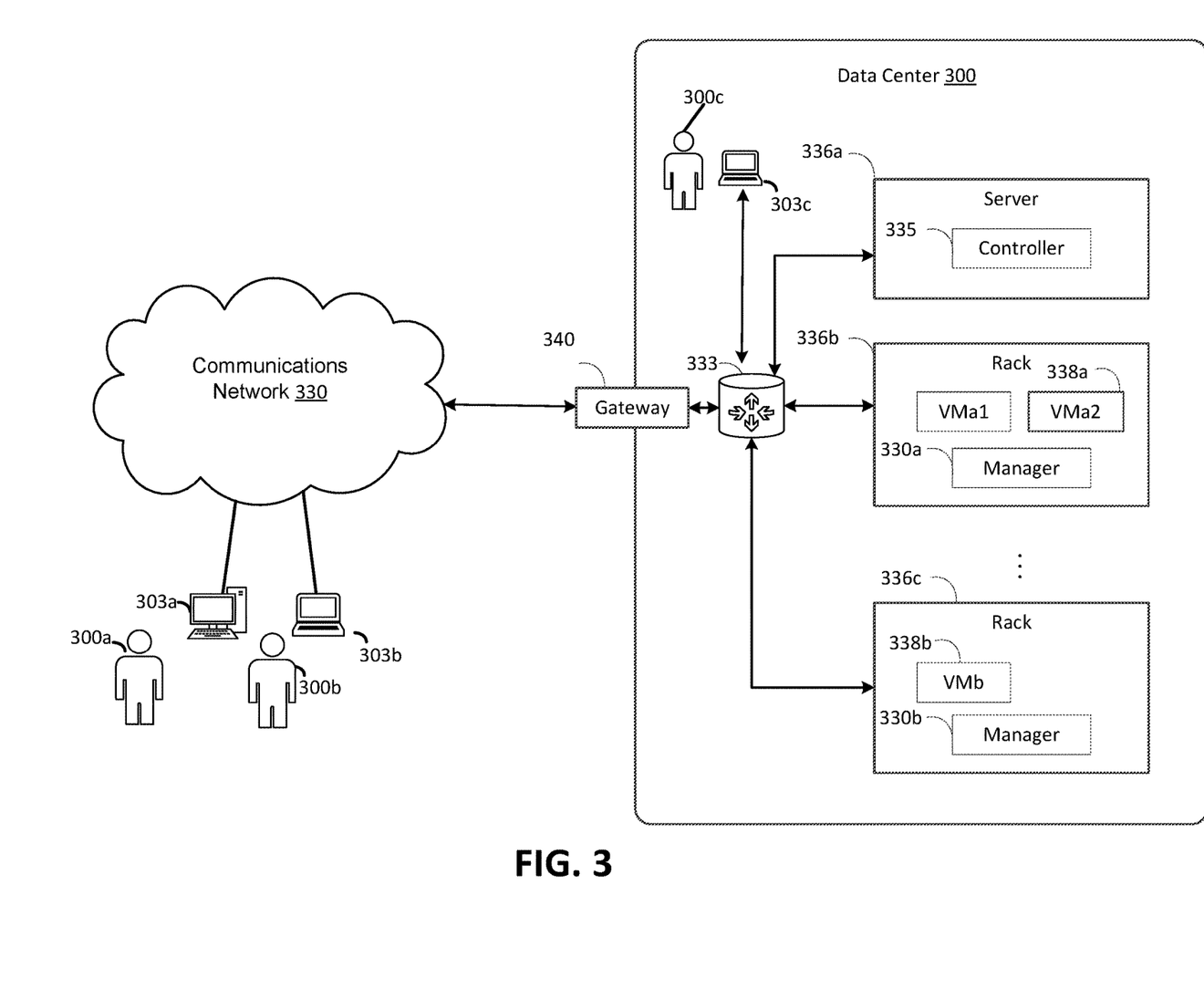
FIG. 3 is a diagram illustrating a data center in accordance with the present disclosure.

FIG. 3 illustrates an example computing environment in which the embodiments described herein may be implemented. FIG. 3 illustrates a data center 300 that is configured to provide computing resources to users 300a, 300b, or 300c (which may be referred herein singularly as "a user 300" or in the plural as "the users 300") via user computers 303a, 303b, and 303c (which may be referred herein singularly as "a computer 303" or in the plural as "the computers 303") via a communications network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 300 may correspond to service provider 100 in FIGS. 1 and 2, or edge site 150 of FIG. 2. Data center 300 may include servers 336a, 336b, and 336c (which may be referred to herein singularly as "a server 336" or in the plural as "the servers 336") that may be standalone or installed in server racks, and provide computing resources available as virtual machines 338a and 338b (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 303. Computers 303 may be computers utilized by users 300. Computer 303a, 303b or 303c may be a server, a desktop or laptop personal computer, a tablet computer, a smartphone, a set-top box, or any other computing device capable of accessing data center 300. User computer 303a or 303b may connect directly to the Internet (e.g., via a cable modem). User computer 303c may be internal to the data center 300 and may connect directly to the resources in the data center 300 via internal networks. Although only three user computers 303a, 303b, and 303c are depicted, it should be appreciated that there may be multiple user computers.

Computers 303 may also be utilized to configure aspects of the computing resources provided by data center 300. For example, data center 300 may provide a Web interface through which aspects of its operation may be configured through the use of a Web browser application program executing on user computer 303. Alternatively, a stand-alone application program executing on user computer 303 may be used to access an application programming interface (API) exposed by data center 300 for performing the configuration operations.

Servers 336 may be configured to provide the computing resources described above. One or more of the servers 336 may be configured to execute a manager 330a or 330b (which may be referred herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 300 shown in FIG. 3, a network device 333 may be utilized to interconnect the servers 336a and 336b. Network device 333 may comprise one or more switches, routers, or other network devices. Network device 333 may also be connected to gateway 340, which is connected to communications network 330. Network device 333 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
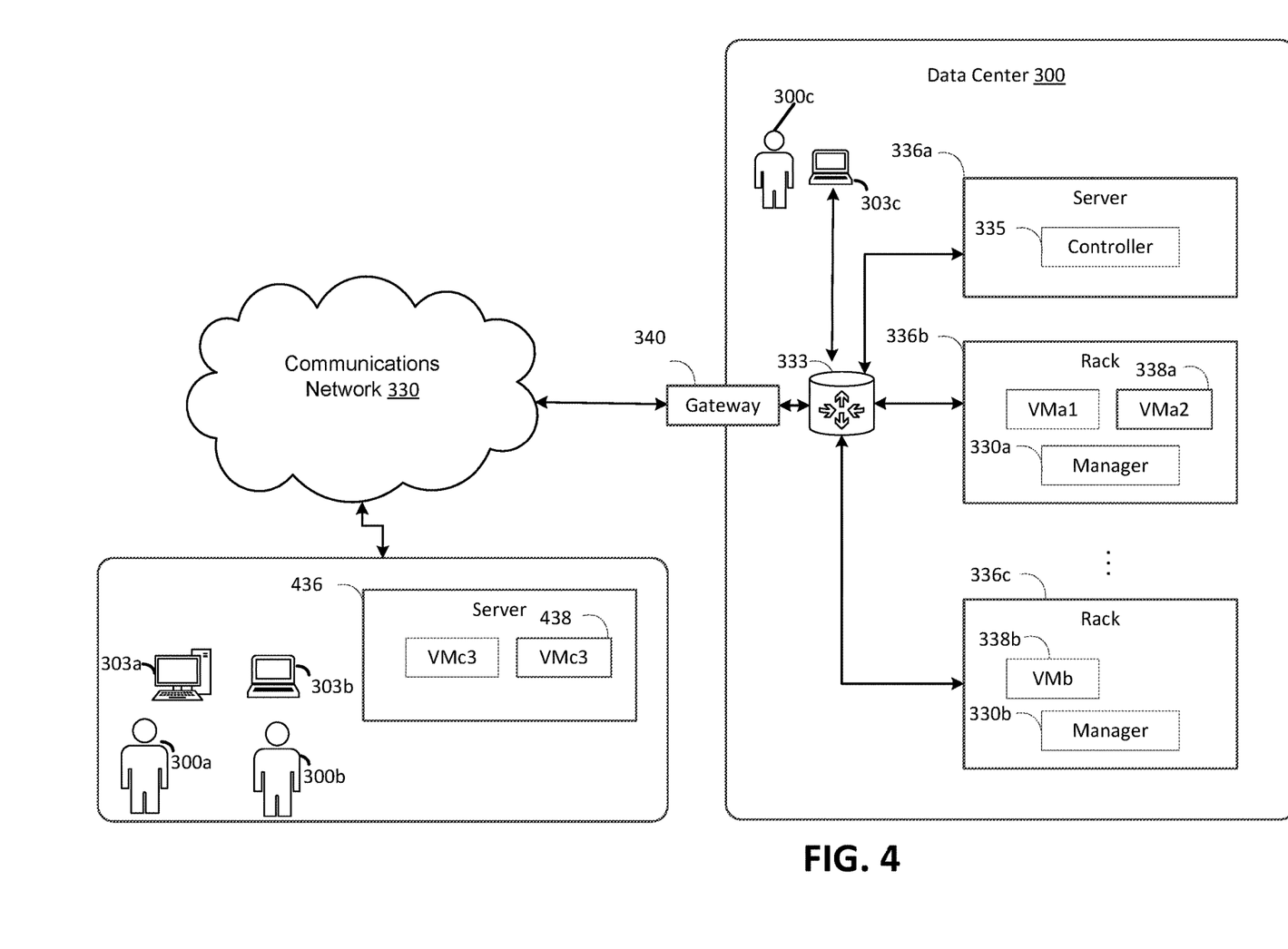
FIG. 4 is a diagram illustrating a data center and local resources in accordance with the present disclosure.

FIG. 4 illustrates an example computing environment illustrating integration of computing resources that are co-located on-premises at a facility local to users 300, in accordance with the present disclosure. In one embodiment, one or more servers 436 may be installed at the user facility. In an embodiment, servers 436 instantiate and run virtual machines 438.

In some embodiments, users 300 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 5:
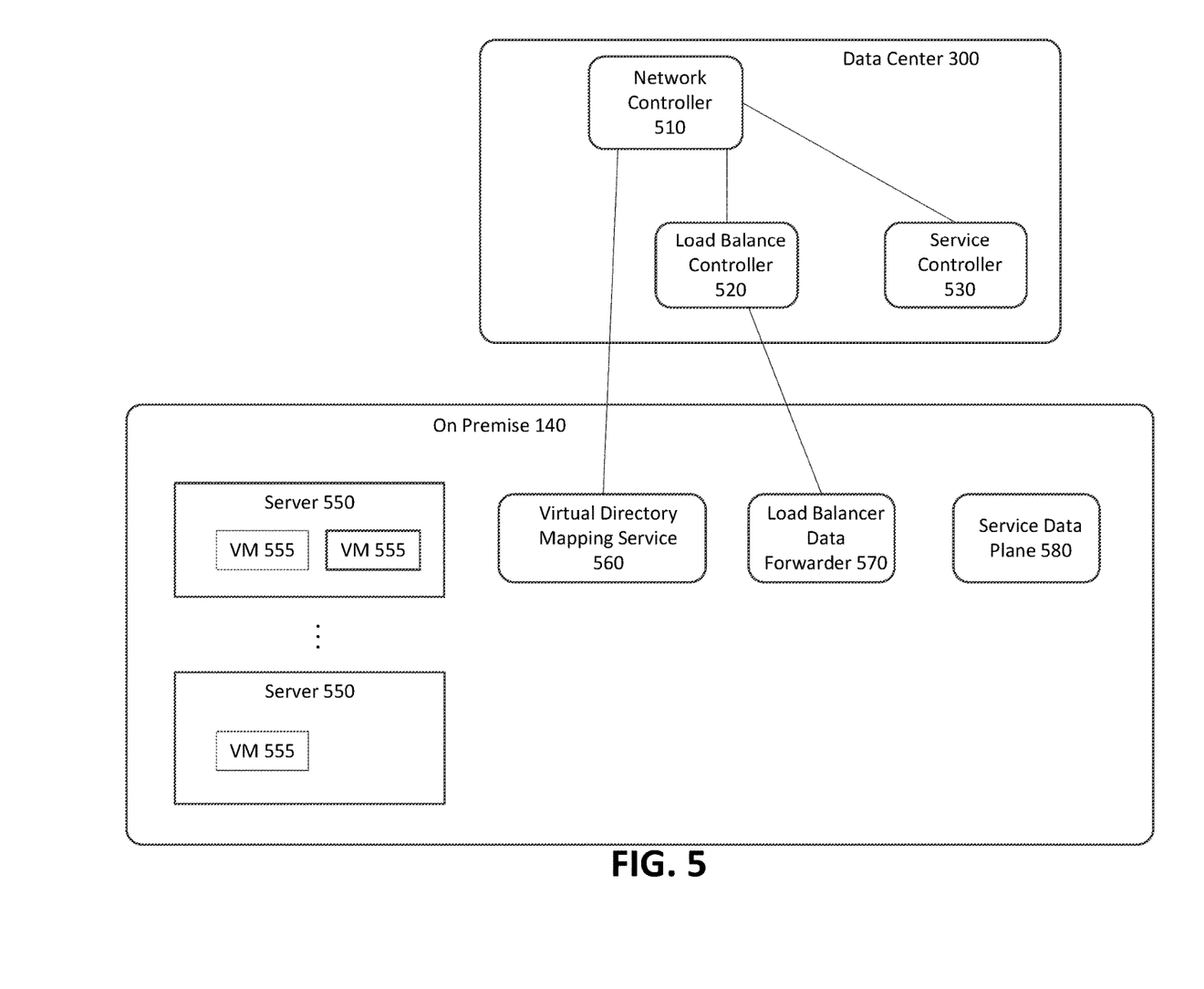
FIG. 5 is a diagram illustrating an architecture for implementing virtual services in accordance with the present disclosure.

With reference to FIG. 5, illustrated is one example architecture for providing remote management of computing resources. In an embodiment, the architecture may include a network controller 510. In some embodiments, the network controller 510 may be configured to provide a centralized point of automated control to manage, configure, monitor, and troubleshoot virtual and physical network infrastructure at the remote service provider and at the on-premise network. The network controller 510 may enable automatic configuration of network infrastructure with the need for performing manual configuration of network devices and services.

The architecture may further provide a virtual network directory mapping service 560, which may be configured to map addresses between networks. The virtual network directory mapping service 560 may ensure secure access to on-premise components to resources at the on-premise site, as well as authorized resources at the data center that are associated with the user of the on-premise site 140.

A load balancing controller 520 may distribute inbound flows that arrive at the load balancer's front end to appropriate virtual machine instances, based on configured load balancing rules, system health, and other factors. The load balancing data forwarder 570 may be configured to distribute flows that arrive at the load balancer's front end at the on-premise location to appropriate virtual machine instances that are running on-premise. The load balancing data forwarder 570 may forward any flows that are to be handled on virtual machines running at the data center 300 to the load balance controller 520.

The service controller 530 may be configured to manage the creation, provisioning, and de-provisioning of virtual machines. The service controller 530 may manage virtual machines both at the data center 300 and at the on-premise site 140. FIG. 5 illustrates that service data plane 580 is implement at the on-premise site 140.

In some embodiments, services such as the network mapping service may be maintained at both the on-premise and at the remote service. Other services that may be replicated may include the load balancer forwarder and other functions of the control plane. In some embodiments, data and/or functionality of some services may be federated between the on-premises network and the remote network. For example, the mapping service may be federated so the mapping service can facilitate communications between a remote virtual machine at the remote service and a local virtual machine running on-premise.

Figure 6:
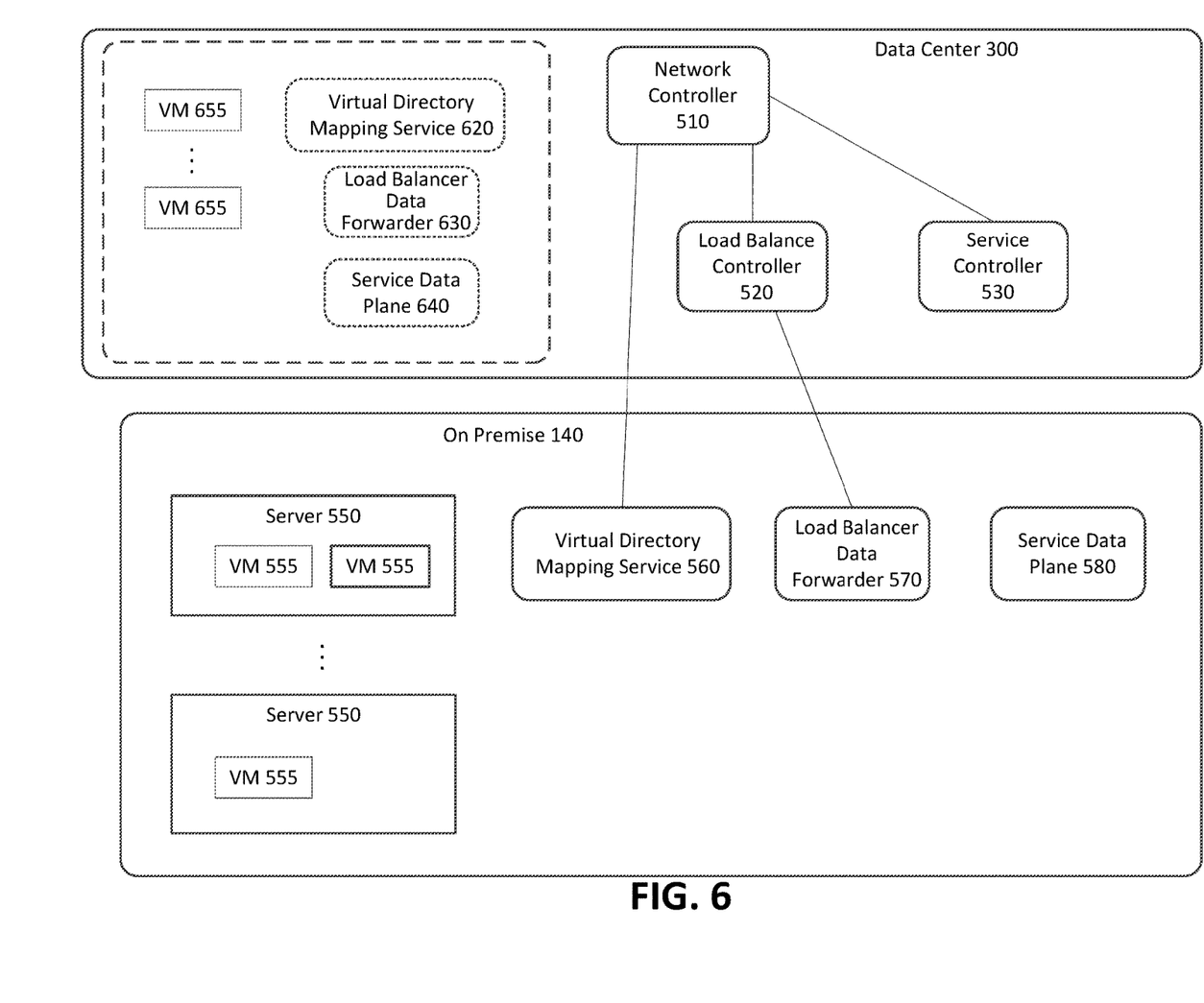
FIG. 6 is a diagram illustrating an architecture for implementing virtual services in accordance with the present disclosure.

With reference to FIG. 6, illustrated is an example architecture for providing remote management of computing resources, where some functions running at the on-premise site 140 are extended at the data center 300. In one embodiment, the functions running in the data center 300 and their counterparts running at the on-premise site 140 may operate in a federated fashion, supporting different aspects of the user's resources in their respective locations.

In further embodiments, one or more virtual machines 655 and service data plane 640 may be maintained at the data center 300, either as a redundant backup or to cooperatively provide virtualized resources.

In one example, if a virtual machine hosted in the data center requests communication to a virtual machine hosted at the on-premise site, the virtual network directory mapping service 560 at the on-premise site 140 and virtual network directory mapping service 620 at the data center 300 may cooperate to facilitate the requested communication. A trust model may be implemented that allows the user's functionality to run partially on premises and while maintaining a separation from other user's data at the remote service provider. Continuous exchange of information and updating of system states may ensure that the local configuration does not diverge from the information maintained at the remote service provider.

By providing remote management and control of the local on-premise network, the remote service provider may enable the user to access the user's information and resources by accessing a coordinated management service that seamlessly operates the user's resources regardless of the physical location of the resources. For example, users may remotely access a user portal provided by the remote service provider that enables visibility and control of the user's resources at both the local on-premise network and the remote service provider.

The functionality implemented at the local on-premise site may be sufficient to enable the services at the local site to continue functioning in the event of loss of connectivity with the remote service provider. Only functionality that depends on the connectivity may be affected. For example, if the control plane connectivity is down, the local site may continue functioning. Only new control plane actions such as create/read/update/delete (CRUD) operations on resources may be delayed in being implemented.

Users may use virtual networks at the local site as they may be implemented at the remote service provider. Users may, for example, define a virtual network region to span user areas implemented at the remote service provider and at the local site. In one example, the local site may be represented as a subnet in the virtual network. The user may launch a resource from the local site by selecting the subnet associated with the intended local site. The local site may be presented as a part of a region that is available to the user similar to other remote sites. The local site may be configured to communicate with any other site owned by the user regardless of the logical and physical distribution of resources.

In one embodiment, the local on-premises network may deploy one or more network devices configured to implement the described infrastructure services. A user who desires to extend their virtualized services to on-premise hardware may delegate one or more subnets in their virtual network to the on-premise network. The control plane functions implemented at the data center may be configured to forward the user's traffic coming in or going out of the user's defined networks to the on-premise network except when the traffic is being sent to a network located at the data center. The control plane may be configured to apply policies that are configured for the user to the on-premise network.

In some embodiments where the service provide implements networks in regions, the on-premise network may be coupled to a home region located proximate to the user's on-premise network and the control plane of the home region may manage the data plane in the on-premise network.

Figure 7:
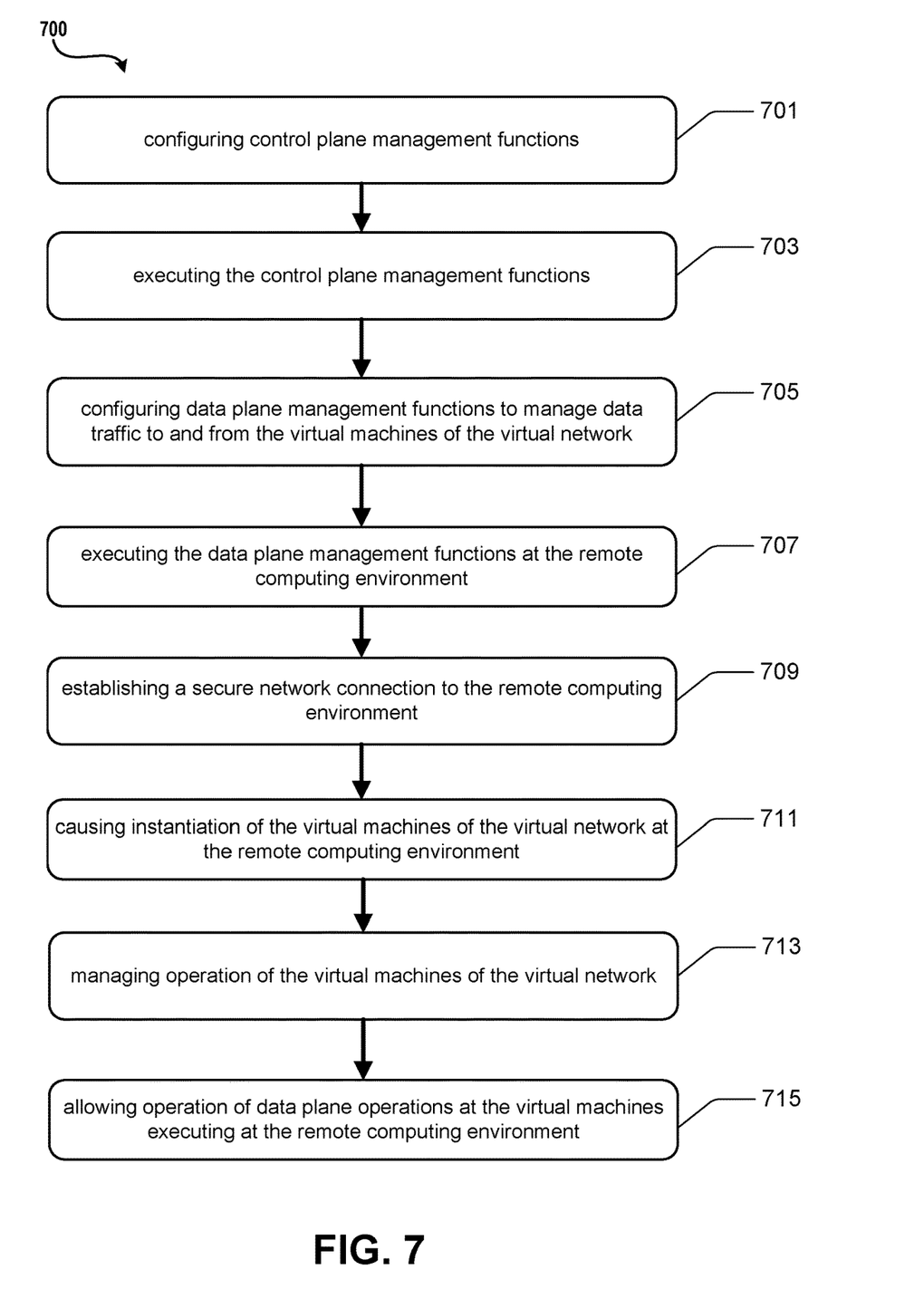
FIG. 7 is a flowchart depicting an example procedure for implementing a virtual network including one or more custom devices in accordance with the present disclosure.

Turning now to FIG. 7, illustrated is an example operational procedure for implementing a virtual network including one or more custom devices that are associated with a user in accordance with the present disclosure. Referring to FIG. 7, operation 701 illustrates configuring control plane management functions to provide and implement virtual machines of a virtual network. In an embodiment, the virtual network comprises one or more virtual machines executing at least in part at a remote computing environment comprising one or more computing devices that are associated with a user of the virtual network.

Operation 701 may be followed by operation 703. Operation 703 illustrates executing the control plane management functions.

Operation 703 may be followed by operation 705. Operation 705 illustrates configuring data plane management functions to manage data traffic to and from the virtual machines of the virtual network. Operation 705 may be followed by operation 707. Operation 707 illustrates establishing a secure network connection to the remote computing environment. Operation 707 may be followed by operation 709. Operation 709 illustrates executing the data plane management functions at the remote computing environment.

Operation 709 may be followed by operation 711. Operation 711 illustrates causing, by the control plane management functions, instantiation of the virtual machines of the virtual network at the remote computing environment. Operation 711 may be followed by operation 713. Operation 713 illustrates managing, using the control plane management functions, operation of the virtual machines of the virtual network.

Operation 713 may be followed by operation 715. Operation 715 illustrates allowing, using the data plane management functions executing at the remote computing environment, operation of data plane operations at the virtual machines executing at the remote computing environment.

In an embodiment, the operational procedure includes maintaining a copy of the data plane management functions.

In an embodiment, the operational procedure includes executing at least a subset of the control plane management functions at the remote computing environment.

In an embodiment, the control plane management functions comprise one or more of a network controller, a service controller, or a load balancer controller.

In an embodiment, the data plane management functions comprise one or more of a virtual network mapping service or a load balancer data forwarder.

In an embodiment, the operational procedure includes implementing a trust model to enable access to the user's data by virtual machines running at the remote computing environment.

In an embodiment, the control plane management functions and data plane management functions are distributed between the remote computing environment and the virtualized computing service provider based on latency. For example, performance of some operations may be impacted by the latency for data transmissions between the remote computing environment and the virtualized computing service provider. To minimize the traffic between the remote computing environment and the virtualized computing service provider, data plane management functions may be executed at the remote computing environment so that the virtual machines executing at the remote computing environment need less communications with the virtualized computing service provider.

In an embodiment, the control plane management functions and data plane management functions are distributed between the remote computing environment and the virtualized computing service provider to provide federated management functions between the remote computing environment and the virtualized computing service provider. In an embodiment, the data plane management functions may be tracked and the virtualized computing service provider may cooperate with the remote computing environment to perform at least some of the data plane management functions. In some embodiments, the virtualized computing service provider may cooperate with the remote computing environment and cause execution of at least a subset of the control plane management functions at the remote computing environment.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 8:
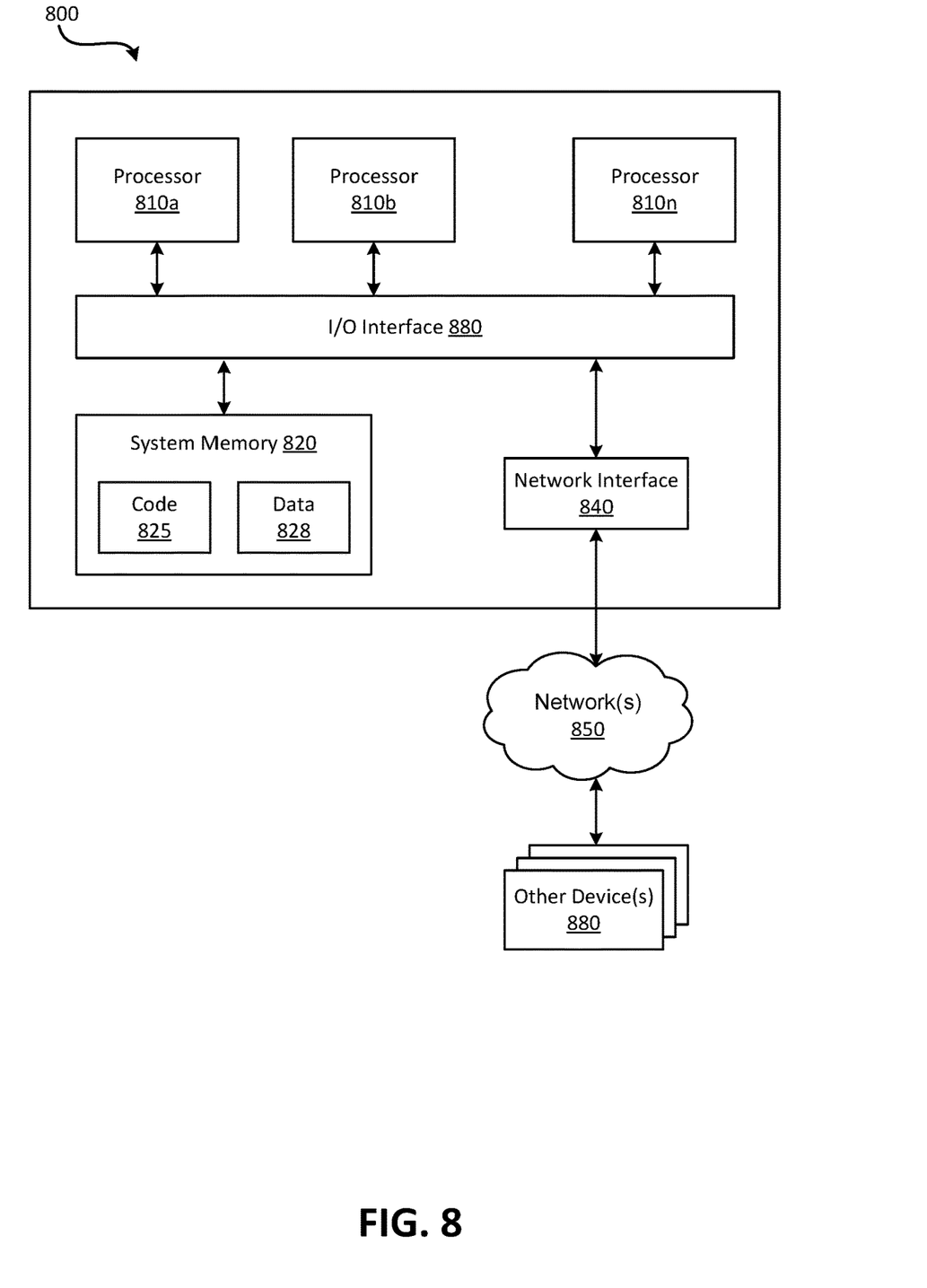
FIG. 8 is an example computing system in accordance with the present disclosure.

FIG. 8 illustrates a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 88 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

System memory 88 may be configured to store instructions and data accessible by processor(s) 810. In various embodiments, system memory 88 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 828.

In one embodiment, I/O interface 830 may be configured to coordinate I/O traffic between the processor 810, system memory 88, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 880 attached to a network or network(s) 880, such as other computer systems or devices as illustrated in FIGS. 1 through 5, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
  one or more processors; and
  a memory in communication with the one or more processors, the memory having computer-readable instructions stored thereupon that, when executed by the one or more processors, cause the system to perform operations comprising:
    configuring control plane management functions at the system to provide and implement virtual machines of a virtual network comprising one or more virtual machines executing as a private network at least in part at a user-implemented remote computing network at a user site comprising a plurality of computing devices physically located at the user site and operating as a computing network separate from the system;
    executing the control plane management functions at the system;
    configuring data plane management functions at the user site to manage data traffic to and from virtual machines of the virtual network executing at the user site, the data plane management functions comprising one or more of a virtual network mapping service or a load balancer data forwarder;

establishing a secure network connection to the computing network at the user site;

causing execution of the data plane management functions at the computing network at the user site;

causing, by the control plane management functions via the secure network connection, instantiation of the virtual machines of the virtual network at the computing network at the user site;

managing, using the control plane management functions via the secure network connection, operation of the virtual machines of the virtual network; and allowing, using the data plane management functions executing at the computing network at the user site, operation of data plane operations at the virtual machines executing at the computing network at the user site.

2. The system of claim 1, further comprising maintaining a copy of the data plane management functions.

3. The system of claim 1, further comprising executing at least a subset of the control plane management functions at the computing network.

4. The system of claim 1, wherein the control plane management functions comprise one or more of a network controller, a service controller, or a load balancer controller.

5. The system of claim 1, further comprising implementing a trust model to enable access to user data by virtual machines running at the computing network.

6. A method for implementing a virtual network by one or more computing systems of a virtualized computing service provider, the virtual network comprising one or more virtual machines executing as a private network at least in part at a computing network at a user site remote from the virtualized computing service provider, the remote computing environment comprising a plurality of computing devices physically located at the user site and operating as a computing network separate from the virtualized computing service provider, wherein the virtual network is managed by the virtualized computing service provider, the method comprising:

configuring, by the virtualized computing service provider, control plane management functions at the virtualized computing service provider to provide and implement the virtual machines of the virtual network;

executing the control plane management functions on the computing systems at the virtualized computing service provider;

configuring, by the virtualized computing service provider, data plane management functions at the computing network at the user site remote from the virtualized computing service provider to manage data traffic to and from the virtual machines of the virtual network, the data plane management functions comprising one or more of a virtual network mapping service or a load balancer data forwarder;

establishing a secure network connection between the virtualized computing service provider and the remote computing network at the user site;

causing execution the data plane management functions at the remote computing network at the user site;

causing, by the control plane management functions via the secure network connection, instantiation of the virtual machines of the virtual network at the remote computing network at the user site;

managing via the secure network connection using the control plane management functions executing at the virtualized computing service provider, operation of the virtual machines of the virtual network; and allowing, using the data plane management functions executing at the remote computing network at the user site, operation of data plane operations on the virtual machines executing at the remote computing network at the user site.

7. The method of claim 6, further comprising maintaining a copy of the data plane management functions at the virtualized computing service provider.

8. The method of claim 6, wherein the control plane management functions comprise a network controller.

9. The method of claim 6, wherein the control plane management functions comprise a service controller.

10. The method of claim 6, wherein the control plane management functions comprise a load balancer controller.

11. The method of claim 6, wherein the control plane management functions and data plane management functions are distributed between the remote computing network and the virtualized computing service provider based on latency.

12. The method of claim 6, further comprising implementing a trust model at the virtualized computing service provider to enable access to user data at the virtualized computing service provider by virtual machines running at the remote computing network.

13. A computer-readable storage medium having computer-executable instructions stored thereupon which, when executed by one or more processors of a computing device, cause the computing device to:

configure control plane management functions at a data center hosting the computing device to provide and implement virtual machines of a virtual network comprising one or more virtual machines executing as a private network at least in part at a remote computing network at a user site comprising a plurality of computing devices physically located at the user site and operating as a computing network separate from the data center;

execute the control plane management functions at the data center;

configure data plane management functions at the remote computing network at the user site to manage data traffic to and from the virtual machines of the virtual network, the data plane management functions comprising one or more of a virtual network mapping service or a load balancer data;

establish a secure network connection to the remote computing network at the user site;

cause execution of the data plane management functions at the remote computing network at the user site;

cause, by the control plane management functions via the secure network connection, instantiation of the virtual machines of the virtual network at the remote computing network at the user site;

manage, using the control plane management functions via the secure network connection, operation of the virtual machines of the virtual network; and allow, using the data plane management functions executing at the remote computing network at the user site, operation of data plane operations at the virtual machines executing at the remote computing network at the user site.

14. The computer-readable storage medium of claim 13, further comprising tracking the data plane management functions and cooperating with the remote computing network to perform at least some of the data plane management functions.

15. The computer-readable storage medium of claim 13, further comprising cooperating with the remote computing network and causing execution of at least a subset of the control plane management functions at the remote computing network.

16. The computer-readable storage medium of claim 13, wherein the control plane management functions comprise one or more of a network controller, a service controller, or a load balancer controller.

17. The computer-readable storage medium of claim 13, further comprising implementing a trust model to enable access to user data by virtual machines running at the remote computing network.

\* \* \* \* \*